United States Patent [19]

de Boer et al.

[11] Patent Number: 4,788,252

[45] Date of Patent: Nov. 29, 1988

[54] MIXTURES BASED ON POLYCARBONATES HAVING IMPROVED PHYSICAL AND CHEMICAL PROPERTIES

[75] Inventors: Jan de Boer, Bergen op Zoom, Netherlands; Jean M. H. Heuschen, Evansville, Ind.

[73] Assignee: General Electric Company, Mt. Vernon, Ind.

[21] Appl. No.: 76,460

[22] Filed: Jul. 22, 1987

[51] Int. Cl.$^4$ ............................................... C08L 69/00
[52] U.S. Cl. ........................................ 525/67; 525/148
[58] Field of Search ............... 525/67, 92, 148, 468, 525/902

[56] References Cited

U.S. PATENT DOCUMENTS 4,569,970  2/1986  Paul et al. ............................... 525/67
4,617,345  10/1986  Sederel ................................... 525/67

FOREIGN PATENT DOCUMENTS 2212384  7/1974  France .
WO8000084  1/1980  PCT Int'l Appl. .

Primary Examiner—Theodore E. Pertilla
Attorney, Agent, or Firm—Martin B. Barancik

[57] ABSTRACT

The invention relates to polymer mixtures which comprise a polycarbonate resin, a graft copolymer having an elastomeric core, and a block copolymer of a polycarbonate and a polysiloxane. These polymer mixtures have only a small tendency to delamination and a good impact strength.

4 Claims, No Drawings

MIXTURES BASED ON POLYCARBONATES HAVING IMPROVED PHYSICAL AND CHEMICAL PROPERTIES

The invention relates to a polymer mixture based on aromatic polycarbonate resin having two polymeric additives one of which is formed by 0.5–10% by weight, related to the said three components, of one or more graft copolymers having an elastomeric core which is built up for more than 50% by weight from a polymerized diene, optionally at least one intermediate phase of vinyl monomer polymerized thereon by grafting and a shell built up from a product of one or more monomers polymerized on the preceding phase by grafting and selected from the group consisting of: $C_1$–$C_6$ alkylacrylates, $C_1$–$C_6$ alkyl methylacrylates, acrylic acid, methacrylic acid and mixtures of two or more of these monomers, with a cross-linking agent, and the other one is a block copolymer.

Such a mixture is known from EP-A-0173358. As a block copolymer is used in the said Application 0.5–4% by weight, related to the ternary mixture, of one or more partially hydrogenated block copolymers, consisting of at least two terminal polymer blocks of A monoalkenyl arylene having a number average molecular weight of from 5,000–125,000 and at least one intermediate polymer block B of conjugated diene having a number average molecular weight from 10,000–300,000, the terminal polymer blocks A constituting 8–55% by weight of the block copolymer, and not more than 25% by weight of the aromatic double bonds of polymer blocks A and at least 80% by weight of the aliphatic double bonds of the polymer blocks B being reduced by hydrogenation.

As compared with the combination of aromatic polycarbonate with exclusively selectively hydrogenated block copolymer known from British Patent Specification No. 2,004,284, the mixtures of EP-A-0173358 show a better impact strength at low temperature, a better resistance to organic solvents and less delamination. However, it has been found in practice that these mixtures are not satisfactory in every respect. Although the impact strength has been improved, the value thereof at low temparature according to the Charpy test still leaves to be desired. Although furthermore the tendency to delamination is small, even this low tendency leads to insufficient depth of the colour in coloured products and sometimes also leads to imperfections in the surface. This latter disadvantage becomes more prominent in particular in the manufacture of big articles such as safety helmets, for which glaring colours are desired, and motor-car bumpers which upon injection molding may start to show unpleasant stripes on the surface.

It is to be noted that delamination of the other hand just promotes a good impact strength. The problem therefore was to further reduce delamination and on the other hand to still improve the impact strength.

The Applicants have surprisingly succeeded in solving this problem by replacing the block copolymer by another block copolymer and slightly adapting the ratios between the three components.

The invention therefore relates to a polymer mixture of the type mentioned in the opening paragraph which is characterised in that, related to the three components, the quantity of aromatic polycarbonate resin is 80–99% by weight and that the third component is formed by 0.5–10% by weight related to the three components, of a block copolymer of polycarbonate and polysiloxane.

The polymer mixture according to the invention preferably comprises 86–97% by weight of aromatic polycarbonate resin, 2–6% by weight of the graft copolymer and 1–8% by weight of the block copolymer.

WO-A-80/00084 describes blends of an aromatic polycarbonate and a block copolymer consisting of alternating segments of an aromatic polycarbonate and a polyorganosiloxane. The addition of a graft copolymer has not been described. The polymer mixture according to the invention has a better combination of flow properties, impact strength, at room temperature and at low temperatures as compared to the mixtures of WO-A-80/00084. The mixtures according to the invention show a greater consistency i.e. when remaking the same formulation there is less deviation in the properties. It seems that there is a better control of the morphology of the mixture according to the invention.

EP-A-0135794 describes polymer mixtures consisting of a polydiorganosiloxane-polycarbonate block copolymer (10–98 parts by weight), a rubbery polymerisate (1–30 parts by weight) and a polyalkyleneterephtalate (0–50 parts by weight) (see claim 2). According to claim 3 the polydiorganosiloxane - polycarbonate block copolymer can be partly replaced by a polycarbonate. There are no examples dealing with a mixture of the three components as claimed in our invention. EP-A-0135794 suggests mixtures comprising a higher content of the polydiorganosiloxane - polycarbonate block copolymers as compared to the content of polycarbonate. The present invention clearly deals with mixtures comprising a higher quantity of polycarbonate as compared to the quantity of block copolymer. Mixtures comprising such high contents of the block copolymer as described in EP-A-0135794 behave as elastomers. The mixtures according to our inventions are much stiffer.

The aromatic polycarbonate resin and the graft copolymer are of the same type as described in EP-A-0173358 and for a further description of these components reference may therefore be made to the said EP-Application. As far as the polycarbonate resin is concerned, it will suffice to state that this is derived generally from a bivalent phenol and a carbonate precursor, for example, phosgene, halogen formiate or carbonate ester, and that many bivalent phenols are suitable, among which bisphenol-A (BPA) is to be preferred, optionally in combination with a halogen containing bivalent phenol to make the material flame-retarding. As is furthermore stated in EP-A-0173358 the aromatic polycarbonate resins preferably have an intrinsic viscosity of approximately 0.30–0.75 parts/g measured at 30° C. in p.dioxan. However, cross-linked polycarbonate resins are also suitable, for example, as described in U.S. Pat. Specification No. 4,001,184.

As already stated, the graft copolymer has also been described elaborately in EP-A-0173358. Therefore, a few remarks will suffice here. The core of the graft copolymer is preferably built up from a styrene-butadiene copolymer having approximately 10–50% by weight of styrene and approximately 90–50% by weight of butadiene. The core may also comprise a cross-linking agent. An optional second or further intermediate phase of the graft copolymer is obtained by graft polymerisation of one or more vinyl monomers, among which styrene is preferred. However, compounds, such as vinyltoluene, alpha-methyl styrene, halogenated styrenes and compounds such as acrylonitrile, methacrylonitrile and their halogenation products may also be used. The shell is obtained by graft polymerisation of one or more of the monomers already indicated hereinbefore for this phase, for example, methyl methacrylate, with a cross-linking agent. The cross-linking agent is conventionally used in a quantity of approximately 0.1-2.5% by weight related to the graft copolymer. As a cross-linking agent is used a polyalkenic unsaturated monomer with unsaturated groups which polymerise approximately at the same rate. This type of cross-linking monomers is generally known and examples hereof are ester of polyoles having two or more acrylor methacrylic acid radicals, polyvinylbenzenes, vinylacrylate and vinyl methacrylate. Butylene diacrylate is preferably used. The presence of the cross-linking agent in the shell is necessary to obtain the desired shell-core structure.

The graft copolymer usually consists of 60-80 parts by weight of core, 10-20 parts by weight of optional intermediate phase and approximately 10-20 parts by weight of shell. A range of commercial products of this kind are marketed by Rohm and Haas Chemical Company under the tradename "ACRYLOID". A further description of the graft copolymers is to be found in addition in U.S Pat. Specification No. 4,180,494.

The block copolymer used according to the invention is a linear block copolymer of polycarbonate and polyeiloxane. Such block copolymers are known per se. The polycarbonate blocks are preferably derived from bisphenol-A; the polysiloxane blocks are, conventionally, derived from siloxanes which are substituted by methyl-, vinyl- and/or phenyl groups, preferably in this case by methyl groups. The number of dimethyl siloxane units per block is preferably 7-11 and a suitable block copolymer of this type is the commercial product "LR 3320" of General Electric, which is a block copolymer of polybisphenol-A-polycarbonate and poly(-dimethyl siloxane) with blocks of approximately 9 siloxane units. A description of suitable block copolymers can be found for example in U.S. Pat. Nos. 2, 999,845, 3,189,662, EP-A-0135794, EP-A-0146827 and EP-A-0193757.

As in the EP-A-0173358, the polymer mixtures of the present invention may comprise, in addition to the above-described constituents, conventional additives, for example, pigments, flame-retarding additives, reinforcing agents, fillers, stabilisers, and the like.

In this case also, the mode of preparation of the polymer mixtures is not critical. As in EP-A-0173358, it is to be preferred to mix the constituents and additives in a dry form, to extrude the resulting mixture and then to chop it to granules which can be subjected to the ultimate shaping process.

The invention will be described in greater detail in the ensuing specific examples.

EXAMPLES

A few mixtures according to the invention were prepared and compared with the preferred mixture of EP-A-0173358.

A homopolymer polycarbonate derived from 2,2-bis (4-hydroxyphenyl)propane (bisphenol-A) and phosgene and having a viscosity of 53 ml/g measured in dichloromethane at 25° C. was used. As in the prior Application, the graft copolymer used was the commercial product ACRYLOID KM 653 and the above-mentioned Copel LR 3320 was used as the block copolymer, while in the comparative test according to EP-A-0173358 the Kraton G 1650 was used.

The mixtures in question were premixed for 3 minutes in a Papenmeyer high-speed mixer with stabilisers (per 100 parts of polymer mixture 0.1 part of organic phosphite, 0.2 parts of organic thio-etherester and 0.3 parts of alkylarylpropionate) and 0.3 parts (per 100 parts of polymer mixture) of soot pigment. The resulting mixture was melted and extruded on a 30 mm double-blade Werner-pfleiderer extruder at 315°-320° C. and then granulated. Standardised test pieces were manufactured from the granulate on an injection moulding machine at 300° C., with which the following properties were determined:

Impact strength according to notch test by Charpy (DIN 53453). This determination was carried out at −30° C.

Melt viscosity at two different shearing rates. The melts are non-Newton liquids and according as they show more thixotropy more delamination will also occur.

Chemical resistance with reference to two tests, namely impact strength according to the "Falling Dart" test at −20° C. after dipping for 30 seconds at room temperature in fuel C (a mixture of iso-octane and toluene). In contrast with the prior Application, a scratch or notch has not been provided in the samples, so that, of course, the values are higher throughout than in the prior Application. The test apparatus cannot determine values higher than 220 J. Therefore, no fracture occurs at higher values and in the table below this is indicated as "NB". Finally, the elongation at fracture was determined, also at −20° C. and without precedng deformation, also after dipping in fuel C at room temperature for 30 seconds. The tensile rate was 100 cm/minute.

The examined compositions and the experimental results obtained are recorded in the table hereinafter.

|  | I | II | III | Comparative |
|---|---|---|---|---|
| Example |  |  |  |  |
| % Polycarbonate | 94 | 92 | 90 | 94 |
| % Acryloid KM 653 | 4 | 4 | 4 | 4 |
| % Copel LR 3320 | 2 | 4 | 6 | — |
| % Kraton G 1650 | — | — | — | 2 |
| Experimental results |  |  |  |  |
| Notch impact value according to Charpy at −30° C. (KJ/m$^2$) | 25 | 36 | 37 | 13 |
| Melt viscosity at 300° C., Pa.s at shearing frequency |  |  |  |  |
| 115 s$^{-1}$ | 348 | 327 | 327 | 472 |
| 1500 s$^{-1}$ | 256 | 250 | 244 | 272 |
| Impact strength at −20° C. according to Falling Dart | 4 × NB 200 | 3 × NB 218 | 3 × NB 210 | 201 204 |

-continued

|  | I | II | III | Comparative |
|---|---|---|---|---|
| method, J, after dipping in Fuel C, for |  | 217 | 190 | 201 |
| 30 seconds, |  |  |  | 216 |
| 5 samples |  |  |  | 218 |
| % elongation at fracture at −20° C. after dipping for 30 seconds in Fuel C without preceding deformation; elongation rate 100 cm/minute | 14 | 23 | 37 | 20 |

As appears from the above experimental results, the present polymer mixtures in the melt show a lower thixotropicity than the best blend of EP-A-0173358 which, therefore, means that the tendency to delamination is also smaller. Furthermore a strongly improved notch impact value according to Charpy is seen. The value for the Falling Dart test after dipping in a petrol-like liquid also shows a significant improvement and it appears from this experiment, and from the test regarding the elongation at fracture, that the chemical resistance of the present mixtures is at least approximately equally great or is better than that of the comparative mixture.

The average molecular weight numbers mentioned herein are number averages and are measured through gel permeation chromatography in $CHCl_3$ at 25° C. with polystyrene as a standard.

We claim:

1. A polymer mixture comprising aromatic polycarbonate resin having two polymeric additives one of which is formed by 0.5–10% by weight, related to the said three components, of one or more graft copolymers having an elastomeric core which is built up for more than 50% by weight from a polymerised diene, optionally at least one intermediate phase of vinyl monomer polymerised thereon by grafting and a shell built up from a product of one or more monomers polymerised on the preceding phase by grafting and selected from the group consisting of: $C_1$–$C_6$ alkylacrylates, $C_1$–$C_6$ alkylmethacrylates, acrylic acid, methacrylic acid and mixtures of two or more of these monomers, with a crosslinking agent, and the other one is a block copolymer, characterised in that, related to the three components, the quantity of aromatic polycarbonate resin is 80–99% by weight and that the third component is formed by 0.5–10% by weight, related to the three components, of a block copolymer of polycarbonate and polysiloxane.

2. A polymer mixture as claimed in claim 1, characterised in that it comprises the three constituents in the following quantities:
   86–97% by weight of aromatic polycarbonate resin;
   2–6% by weight of graft copolymer and
   1–8% by weight of block copolymer.

3. A polymer mixture as claimed in claim 1, characterised in that the block copolymer is built up from polycarbonate derived from bisphenol-A and polydimethylsiloxane.

4. A polymer mixture as claimed in claim 2, characterized in that the block copolymer is built up from polycarbonate derived from bisphenol-A and polydimethylsiloxane.

* * * * *

UNITED STATES PATENT AND TRADEMARK OFFICE
CERTIFICATE OF CORRECTION

PATENT NO. : 4,788,252

DATED : November 29, 1988

INVENTOR(S) : Jan de Boer & Jean Marie Hubert Heuschen

It is certified that error appears in the above-identified patent and that said Letters Patent is hereby corrected as shown below:

Column 3
Line 28
"polyeiloxane" should read "polysiloxane"

Column 1
Line 56
"of" should read "on"

Signed and Sealed this

Twenty-first Day of August, 1990

Attest:

HARRY F. MANBECK, JR.

Attesting Officer

Commissioner of Patents and Trademarks